March 24, 1953 — G. J. WILLIAMS — 2,632,334
PULLEY ASSEMBLY
Filed May 2, 1950
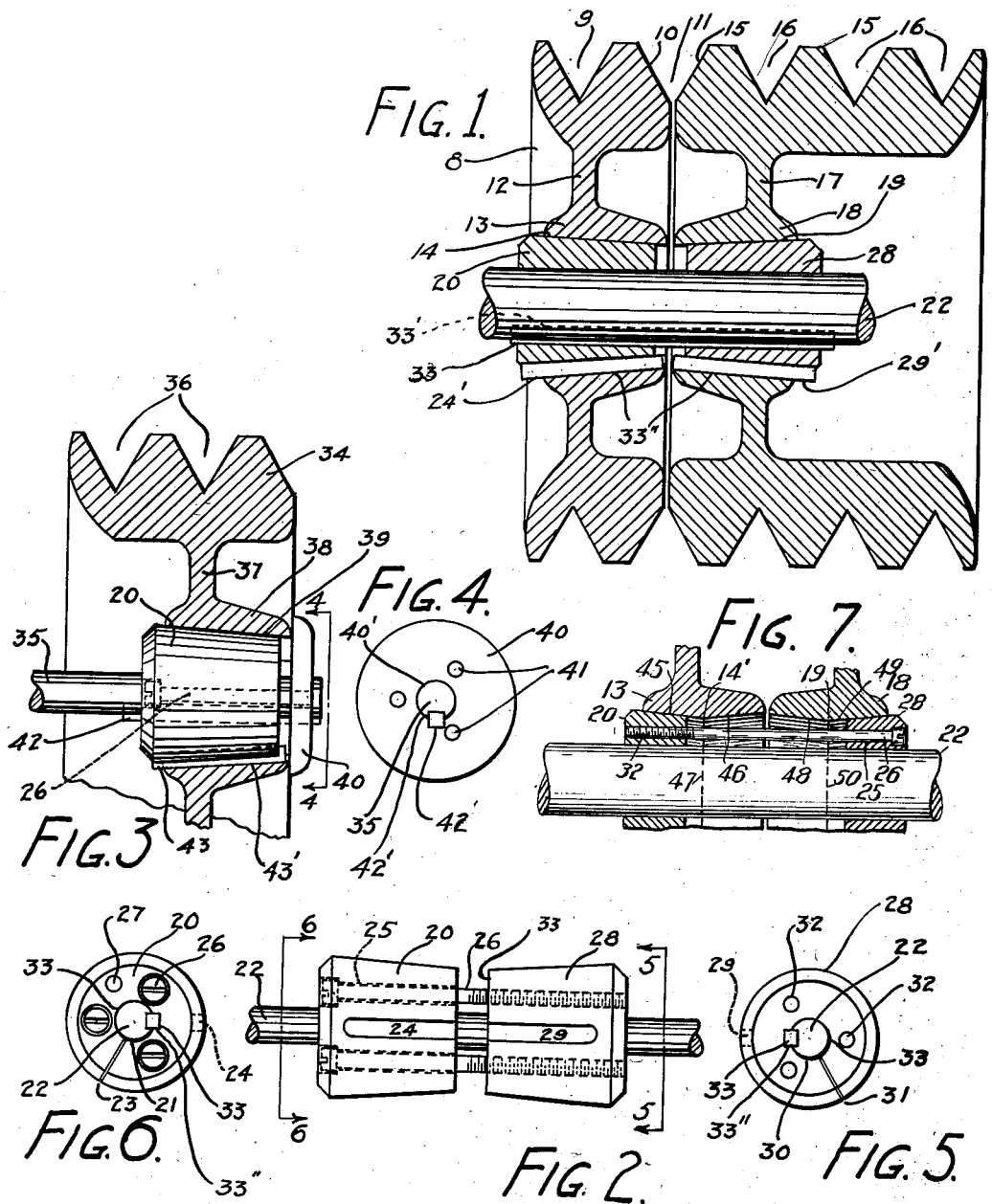
INVENTOR
GLENN J. WILLIAMS
BY Cyrus Kehr & Sweeker
ATTORNEYS Patented Mar. 24, 1953

2,632,334

UNITED STATES PATENT OFFICE 2,632,334

PULLEY ASSEMBLY

Glenn J. Williams, Morristown, Tenn.

Application May 2, 1950, Serial No. 159,442

9 Claims. (Cl. 74—230.3)

This invention relates to a new and improved pulley assembly, and is particularly directed to a plurality of interchangeable pulleys or sheaves which are held together and upon a shaft by means of a novel bushing.

It is customary to manufacture and distribute for sale among the trade pulleys or sheaves of various sizes. This is particularly true in the case of a V-belt sheave in which the number of grooves varies for different jobs. Accordingly, it is necessary for the distributor or dealer to stock a great many different sheaves. This is unsatisfactory because of the cost involved in maintaining such a stock, and also because it requires a great deal of storage space to carry a sufficiently large variety of sheaves to satisfy the many needs of the trade.

One object of this invention is to overcome the above objection by providing a pulley or sheave assembly which can be "built up" to any number of grooves, or to any size pulley desired, from a common basic pulley.

Another object of this invention is to provide a pulley or sheave assembly that is held together and upon a shaft by means of a bushing alone.

Another object of this invention is to provide a new and improved bushing for maintaining either a single or plural pulleys or sheaves upon a shaft.

Other objects and advantages of this invention will become apparent as the discussion proceeds and when taken in connection with the accompanying drawings, in which:

Fig. 1 is a longitudinal section of a pulley or sheave assembly embodying my invention, showing a pair of V-belt sheaves assembled on a shaft and held thereon by means of bushings;

Fig. 2 is a plan view of the bushings shown in Fig. 1;

Fig. 3 is a longitudinal section of a single pulley connected to a single bushing embodying another form of my invention;

Fig. 4 is an end view of a retaining plate of Fig. 3, taken on the line 4—4 in Fig. 3;

Fig. 5 is an end elevation of the bushings, taken along the line 5—5 in Fig. 2;

Fig. 6 is a similar view taken along the line 6—6 in Fig. 2; and

Fig. 7 is a longitudinal section of a pulley or sheave assembly embodying another form of my invention.

Referring now to a detailed description of the drawings, the numeral 8 designates one spider of a V-belt sheave, by way of illustration, although other types of sheaves or number of grooves may be used. The numeral 9 designates a groove in the spider 8, which receives a single V-belt. The spider 8 is provided with a web 12 on a hub 13. The spider 8, the web 12, and the hub 13, preferably are formed integral and cast in one piece. A beveled shoulder 10 is provided on the spider 8 as shown, forming a half groove on an edge of the sheave.

The hub 13 is provided with a central bore or opening 14 which, preferably, should be circular, but it may be made of rectangular or other cross section. The opening 14 may be tapered as shown in Fig. 1, uniformly from side to side of the hub, or divergently as shown in Fig. 7.

In Fig. 1 there is also shown a second spider, designated generally by the numeral 15. Any number of desired grooves 16 can be formed in the spider 15, although three are shown here by way of illustration. As a matter of fact, as set forth in the objects of my invention, it is preferred that spiders 15, each having a different number of grooves 16, be provided, and all are made interchangeable. Regardless of the number of grooves 16 in the spider 15, there is provided a web 17 and a hub 18 as shown. The hub 18 is also provided with a central bore or opening 19 which is tapered. The hub 18 and the bore 19 preferably are tapered in the opposite direction to the hub 13 and tapered opening 14. A beveled shoulder 15' is provided on the spider 15 as shown and when the spiders 8 and 15 are placed together in face-to-face relationship the shoulders 10 and 15' form a V-belt pulley groove 11.

Turning now to a detailed description of the bushing shown in detail in Fig. 2, the numeral 20 designates, generally, one of a pair of tapered bushings which is of the same taper as the openings 14 and 19. The tapered bushing 20 is provided with a central opening or bore 21 extending therethrough, and is adapted to receive a shaft 22 therein. The bushing 20 is provided with a slot 23 which extends from the circumference thereof into the bore 21, and extends longitudinally throughout the length of the bushing. A keyway 24 preferably is provided receiving a key 24' as shown in Figs. 1 and 6, for the purpose of locking the bushing 20 onto either the hub 13 or 18.

Extending longitudinally through the bushing 20 is a plurality of circumferentially spaced holes 25 which are adapted to receive therethrough stud bolts 26. Any number of these bolts 26 and holes 25 may be provided in the bushing, but it is preferred that at least three be provided. In the bushing 20 there is provided a further hole 27, which is disposed out of circumferential alignment from the holes 25, threaded substantially throughout its length and extends completely through the bushing, as shown. The holes 25 are "smooth sided"; i. e., are not threaded, so as to permit free turning of the bolts 26. The hole 27 is internally threaded and should be of the same diameter and thread pitch as the threads on the stud bolts 26.

A second bushing 28, very similar to the bushing 20, is also provided, with sides of the same taper, as shown. A keyway 29, complementary to keyway 24, is provided therein, and receives a key 29'.

A central opening or bore 30 in axial alignment with the central bore 21, is provided, and a slot 31 similar to the slot 23 extends from the outer circumference of the bushing to the bore 30 and throughout the length thereof. A plurality of holes 32, each complementary to the holes 25 of the bushing 20, are provided as shown in Fig. 5. The holes 32 are provided throughout their length with internal threads of a size and pitch adapted to receive the threaded ends of the stud bolts 26. The bushing 28 differs from the bushing 20 in that the holes 32 are threaded, and in the omission of the threaded hole 27.

When the bushings are assembled on the shaft 22, the holes 25 and 32 are axially aligned, and the stud bolts 26 extend through the holes 25 and are threaded into the holes 32. It will be seen from a study of Fig. 6 that the threaded hole 27 in the bushing 20 is positioned so as to be out of circumferential alignment with the holes 32. The purpose of this is to enable the breaking apart of the assembly by removal of one of the bolts 26 from the bushings and by threadedly inserting it through the hole 27. This will place the end of the replaced bolt 26 against the inside face 33 of the bushing 28. By tightening of the replaced bolt 26, the bushings will be caused to spread apart and will be loosened from the hubs of the sheaves after the remaining bolts 26 have been completely loosened.

A key 33 is provided in a keyway 33' in the shaft 22 and in keyways 33'' in the bushings 20 and 28, for keying the bushings to the shaft 22.

Turning now to a detailed description of another form embodying my invention, shown in Figs. 3 and 4, a single spider 34 is held on a shaft 35 by means of the single bushing 20. The spider 34 is provided with any suitable number of grooves 36 and with a web 37 and hub 38. The hub 38 is provided with a taper in its central bore 39 complementary to the taper of bushing 20.

A plate 40, shown in Fig. 4, is provided with a plurality of holes 41, here shown to be three in number. The holes 41 are spaced correspondingly with the holes 25 of the bushing 20, and are provided with internal threads in very much the same manner as the threaded holes 32 of the bushing 28. In fact, the plate 40, when used in the form shown in Fig. 3, is adapted to take the place of the bushing 28, and abuts against the edge of the hub 38.

A key 42 is provided in a keyway 42' located in the shaft 35 and in the keyway 33'' in the bushing 20 for holding the bushing to the shaft 35. A second key 43 is provided in the keyway 24 and in a complementary keyway 43' located in the hub 38 for holding the bushing 20 to the spider 34.

In Fig. 7 there is shown another form embodying my invention similar to that of Fig. 1, with the taper of the bores 14 and 19 of the hubs 13 and 18 slightly modified to permit face-to-face inversion of the pulleys. Both of the hubs 13 and 18 are provided with bores 14' and 19' extending therethrough. However, the side walls of the bores instead of tapering continuously throughout the length thereof, as shown in Fig. 1, taper inwardly from both ends of each.

The bore 14' of the hub 13 tapers inwardly from the outside of one side to approximately the center of the hub as indicated at 45. On the opposite side of the hub 13 the bore 14' tapers inwardly from the outside opposite edge of the hub, as indicated at 46. The tapering sides of the bore 14' converge along a circumferential line 47 located approximately in the center of the hub 13.

The bore 19' of the hub 18 is constructed similarly to the bore 14' of the hub 13 and tapers inwardly from one side thereof to approximately the center, as indicated at 48. The opposite side of the bore 19' tapers inwardly, as indicated at 49. The tapered sides 48 and 49 converge along a circumferential line 50 located approximately in the center of the hub 18.

The assembly of my pulley or sheave is as follows:

In Fig. 1, the bushing 20 is first placed on the shaft 22. The tapered central hole 14 of spider 8 is then fitted onto the bushing 20. The spider 15 is then placed over the shaft 22 against the spider 10. The bushing 28 is then slid over the shaft 22 and into the tapered opening 19 of the hub 18. The bolts 26 are then placed through the holes 25 and threaded into the holes 32 which have been first aligned with holes 25 until the bushings 20 and 28 are drawn together. It will be seen from this that the spiders 8 and 15 are thus drawn firmly together onto the shaft 22 and are held thereon by means of these bushings. As explained above, the spiders 8 and 15 can be readily interchanged with other spiders leaving a different number of grooves therein.

In the form of my invention shown in Fig. 3, when it is desired to use but a single spider, the bushing 28 is omitted and the plate 40 is substituted therefor. The bushing 20 is fitted onto the shaft 35 and the tapered opening 39 of the hub 38 fitted over the bushing. The bolts 26 are then placed through the openings 25 and are threaded into the openings 41 of the plate 40, and the plate 40 and bushing 20 are drawn together until the spider 34 is secured tightly onto the shaft 35. Different sheaves 34 with different numbers of grooves 36 may thus be used.

In the form shown in Fig. 7 the bushings and the sheaves are assembled in the same manner as shown in Fig. 1. If a single pulley is used with the form shown in this embodiment of my invention, the pair of bushings 20 and 28 may be used instead of the bushing 20 and the plate 40, as shown in Fig. 3.

While the invention has been illustrated and described in certain embodiments, it is to be understood that variations and changes in the number of grooves in each of the sheaves, the particular type of the bushings, and the type of material used, may be resorted to without departing from the spirit of my invention, except as specified in the claims.

I claim:

1. A sheave assembly comprising a pair of spiders, a hub portion on each of said spiders, each of said hub portions having a tapered bore extending therethrough, each of said tapered bores having substantially the same taper throughout the length thereof, and means including a pair of slotted bushings fitted into the bores of said hub portions adapted to connect together and to hold the spiders onto a shaft in face-to-face relation, the outer circumference of each of said bushings being tapered complementary to the tapered bores of said hubs.

2. A sheave assembly comprising a pair of spiders, hub portions on each of said spiders, each of said hub portions having a tapered bore extending therethrough, each of said tapered bores having substantially the same taper throughout the length thereof, a pair of slotted bushings fitted into the bores of the hub portions adapted to hold the spiders onto a shaft in face-to-face relation, the outer circumference of each of said bushings being tapered complementary to the tapered bores of said hubs, each of said bushings having a plurality of circumferentially spaced complementary holes extending longitudinally therethrough, and means extending into said holes for retaining the bushings together.

3. A sheave assembly comprising a pair of spiders, hub portions on each of said spiders, each of said hub portions having a tapered bore extending therethrough, each of said tapered bores having substantially the same taper throughout the length thereof, a pair of slotted bushings fitted into the bores of said hub portions adapted to hold the spiders onto a shaft in face-to-face relation, the outer circumference of each of said bushings being tapered complementary to the tapered bores of said hubs, each of said bushings having a plurality of circumferentially spaced complementary holes extending therethrough, one of said bushings having an additional threaded hole extending therethrough, said additional hole being located out of circumferential alignment with the first-mentioned circumferentially spaced holes whereby a threaded member may be inserted therein to urge the bushings apart, and means extending into said holes for retaining the bushings together.

4. A sheave assembly comprising a pair of spiders, hub portions on each of said spiders, each of said hub portions having a tapered bore extending therethrough, each of said tapered bores having substantially the same taper throughout the length thereof, a pair of slotted bushings fitted into the bores of said hub portions adapted to hold the spiders onto a shaft in face-to-face relation, the outer circumference of each of said bushings being tapered complementary to the tapered bores of said hubs, each of said bushings having a plurality of circumferentially spaced axially aligned holes extending therethrough, and a plurality of stud bolts extending through the axially aligned holes in both of the bushings adapted to draw the bushings together whereby the spiders are clamped together and onto said shaft.

5. A sheave assembly comprising a pair of spiders, each of said spiders having a beveled shoulder formed on the periphery thereof, a hub portion on each of said spiders, each of said hub portions having a tapered bore formed therein, a pair of slotted bushings fitted into the bores of said hub portions adapted to hold the spiders on a shaft in face-to-face relation with said beveled shoulders in juxtaposition to form a V-belt receiving groove therebetween, each of said bushings having a plurality of circumferentially spaced, axially aligned holes extending therethrough, and a plurality of bolts extending through the axially aligned holes in both of the bushings and adapted to draw the bushings together whereby the spiders are clamped together and onto said shaft.

6. A sheave assembly comprising a pair of spiders, each of said spiders having a beveled shoulder formed on the periphery thereof, a hub portion on each of said spiders, each of said hub portions having a tapered bore extending therethrough, each of said tapered bores having substantially the same taper throughout the length thereof, a pair of slotted bushings fitted into the bores of said hub portions adapted to hold the spiders on a shaft in face-to-face relation with said beveled shoulders in juxtaposition to form a V-belt receiving groove therebetween, the outer circumference of each of said bushings being tapered complementary to the tapered bores of said hubs, each of said bushings having a plurality of circumferentially spaced axially aligned holes extending therethrough, and a plurality of stud bolts extending through the axially aligned holes in both of the bushings adapted to draw the bushings together whereby the spiders are clamped together and onto said shaft.

7. A sheave assembly comprising a pair of spiders, said spiders each having at least one V-belt receiving groove formed in the periphery thereof, said spiders each having at least one beveled surface formed thereon adjacent their respective peripheries, a hub portion on each of said spiders, each of said hub portions having a continuous tapered bore extending therethrough, each of said bores tapering outwardly from that end of said hub adjacent said beveled surface to the other end thereof, a slotted bushing fitted into the bores of each of said hub portions adapted to hold said spiders on a shaft in face-to-face relation with said beveled surfaces in juxtaposition to form a V-belt receiving groove therebetween, the outer circumference of each of said bushings being tapered complementary to the tapered bores of said hubs, each of said bushings having a plurality of circumferentially spaced axially aligned holes extending therethrough, and a plurality of stud bolts extending through the axially aligned holes in both of the bushings adapted to draw the bushings together whereby the spiders are clamped together and on said shaft.

8. A sheave assembly comprising a pair of spiders, said spiders each having at least one V-belt receiving groove formed in the periphery thereof, said spiders each having at least one beveled surface formed thereon adjacent their respective peripheries, a hub portion on each of said spiders, each of said hub portions having a continuous tapered bore extending therethrough, each of said bores tapering outwardly from that end of said hub adjacent said beveled surface to the other end thereof, a slotted bushing fitted into the bores of each of said hub portions adapted to hold said spiders on a shaft in face-to-face relation with said beveled surfaces in juxtaposition to form a V-belt receiving groove therebetween, the outer circumference of each of said bushings being tapered complementary to the tapered bores of said hubs, each of said bushings having a plurality of circumferentially spaced axially aligned holes extending therethrough, a plurality of stud bolts extending through the axially aligned holes in both of the bushings adapted to draw the bushings together whereby the spiders are clamped together and on said shaft, and one of said bushings having a transversely extending threaded hole formed therein out of circumferential alignment with the other of said holes, said threaded hole receiving one of said stud bolts whereby as said bolt is threaded into said threaded hole an end thereof engages and is forced against the end surface of the other of said bushings to break said bushings out of said hubs.

9. A sheave assembly comprising a pair of spiders, said spiders each having at least one V-belt receiving groove formed in the periphery thereof, said spiders each having at least one beveled surface formed thereon adjacent their respective peripheries, a hub portion on each of said spiders, each of said hub portions having tapered bores extending inwardly from each end thereof, a slotted bushing for each of said hub portions, said bushings being positioned in a tapered bore of each of said hubs and being adapted to hold said spiders on a shaft in face-to-face relation with said beveled surfaces in juxtaposition to form a V-belt receiving groove therebetween, the outer circumferences of said bushings being tapered complementary to the tapered bores of their respective hubs, each of said bushings having a plurality of circumferentially spaced axially aligned holes extending therethrough, and a plurality of stud bolts extending through the axially aligned holes in both of the bushings and adapted to draw the bushings together whereby the spiders are clamped together and on the said shaft.

GLENN J. WILLIAMS.

REFERENCES CITED

The following references are of record in the file of this patent:

UNITED STATES PATENTS

| Number | Name | Date |
|---|---|---|
| 386,278 | Stuart | July 17, 1888 |
| 849,860 | Searle | Apr. 9, 1907 |
| 1,395,913 | Ford | Nov. 1, 1921 |
| 1,580,919 | Reeves | Apr. 13, 1926 |
| 1,907,345 | Cornish | May 2, 1933 |
| 1,995,907 | Stoll | Mar. 26, 1935 |
| 2,156,920 | Mitchell | May 2, 1939 |
| 2,427,172 | Williams | Sept. 9, 1947 |
| 2,460,631 | Fawick | Feb. 1, 1949 |

FOREIGN PATENTS

| Number | Country | Date |
|---|---|---|
| 393,386 | France | Dec. 21, 1908 |